United States Patent [19]
Murayama et al.

[11] Patent Number: 6,147,954
[45] Date of Patent: Nov. 14, 2000

[54] OPTICAL CHARACTERISTICS SWITCHING MECHANISM OPTICAL HEAD AND OPTICAL APPARATUS

[75] Inventors: Tomohiro Murayama; Isao Kishimoto, both of Yokohama; Hiroshi Kawakami, Chigasaki, all of Japan

[73] Assignee: Kabushiki Kaisha Toshiba, Kawasaki, Japan

[21] Appl. No.: 09/082,464

[22] Filed: May 21, 1998

[30] Foreign Application Priority Data

May 22, 1997 [JP] Japan ..................................... 9-132392

[51] Int. Cl.⁷ ...................................... G11B 7/12
[52] U.S. Cl. ..................... 369/112; 369/44.14; 369/44.17
[58] Field of Search .................... 369/54, 44.14, 369/44.17, 44.18, 44.19, 44.21, 44.22, 44.23, 112

[56] References Cited

U.S. PATENT DOCUMENTS 5,815,328  9/1998  Makita ............................. 369/44.18 X
5,986,984  11/1999  Nakamura et al. .................. 369/44.23

FOREIGN PATENT DOCUMENTS

61-233437  10/1986  Japan.

*Primary Examiner*—Muhammad Edun
*Attorney, Agent, or Firm*—Pillsbury Madison & Sutro LLP

[57] ABSTRACT

The present invention relates to an optical characteristics switching mechanism for switching optical characteristics of an optical system by selectively locating an optical element in an optical path of the optical system. The optical characteristics switching mechanism of the present invention comprises optical characteristics switching element for selectively arranging a holder holding the optical element at either of a first position at which the optical element exists in the optical path and a second position at which the optical element is out of the optical path, by rotating the holder with use of a magnetic force.

11 Claims, 7 Drawing Sheets

OPTICAL CHARACTERISTICS SWITCHING MECHANISM OPTICAL HEAD AND OPTICAL APPARATUS

BACKGROUND OF THE INVENTION

This invention relates to improvement of an optical characteristics switching mechanism for switching optical characteristics of an optical system. This invention also relates to an optical head device and an optical disk reproduction/recording apparatus having the optical characteristics switching mechanism.

As is well known, an optical disk reproducing/recording system for reproducing/recording information from/in an optical disk as a recording medium has an optical head. The optical head records information in an optical disk by irradiating the optical disk with a laser beam and reads information stored in the optical disk by irradiating the optical disk with a laser beam and receiving the laser beam reflected from the optical disk.

In recent years, various types of optical disks have been developed. Among the new disks, a type of optical disk: a DVD (Digital Versatile Disk) remarkably attracts attention. A DVD has a diameter of 12 cm equal to that of the conventional CD (Compact Disk). A DVD, however, has a signal recording substrate as thin as 0.6 mm, unlike the conventional CD. In compensating the thinness, the signal recording substrate is doubled by adhering two signal recording substrates to each other on their back sides, to increase the thickness of the DVD to 1.2 mm, equal to the conventional CD.

With use of such thin signal recording substrates, the adverse effect due to the tilt of the optical disk can be reduced to remarkably improve the information recording density. More specifically, a DVD with two signal recording substrates adhered to each other can store a vast amount of information as large as 4.7 GB (Giga Bytes).

In the mean time, it is eagerly required for the optical system for reading information stored in a DVD to have compatibility with the system for the conventional CD so that the DVD optical system can read the information signal stored in the conventional CD. In order to attain the compatibility of the optical systems for the conventional CD and the DVD, the optical characteristics of the optical head in the DVD optical system need to be switched in reproducing DVD and in reproducing CD.

In order to switch the optical characteristics of the optical head, various methods as suggested below have been proposed: (1) a method by switching two objective lenses: a lens for a DVD, and a lens for a CD; (2) a method by forming a focus for reproducing a CD with use of an objective lens for a DVD by arranging hologram or the like; and (3) a method by arranging in a system an element for changing the numerical aperture of the objective lens for a DVD in order to reproduce/record information from/in a CD.

The first method, however, needs two objective lenses high in price, and thus is disadvantageous in an economical field of view. Further, it is very difficult to completely coincide the axial tilts of two objective lenses. In addition, the optical head body for containing the two objective lenses will inevitably increases in size, to fail the reduction of the optical head in size.

Similarly, according to each of the second and third methods, the optical system has an optical path in which the utility efficiency of the laser beam may be decreased. As a result, a part of the optical characteristics, which enables the reproduction of the DVD, may be deteriorated.

The switching means used for switching normal scope/panorama scope or used for zooming in a digital still camera can be also employed to switch the optical characteristics of the optical head. With use of such switching means, however, the body of the system will inevitably increase in size and it is thus very difficult to use such switching means used in the conventional digital still camera in such a compact device as an optical head in the DVD reproduction/recording system.

BRIEF SUMMARY OF THE INVENTION

The present invention is developed in consideration of the problems as described above, to provide an optical characteristics switching mechanism which can switch optical characteristics of an optical system without deteriorating any part of the optical characteristics of the system, be simple in structure, reduce the optical system in size, and thus be economically advantageous. It is also an object of the present invention to provide an optical head device and an optical disk reproduction/recording apparatus having the optical characteristics switching mechanism.

The present invention relates to an optical characteristics switching mechanism for switching optical characteristics of an optical system by selectively locating an optical element in an optical path of the optical system. The optical characteristics switching mechanism of the present invention comprises a holder which holds the optical element; and an optical characteristics switching member which selectively arranges the holder holding the optical element at either of a first position at which the optical element exists in the optical path and a second position at which the optical element is out of the optical path, by rotating the holder with use of a magnetic force.

The present invention also relates to an optical head having a laser beam emitting section, an objective lens for converging the laser beam emitted by the laser beam emitting section to make the converged laser beam incident on an optical disk, a photodetecting section for receiving a laser beam reflected from the optical disk through the objective lens. The optical head further comprises an optical characteristics switching mechanism for switching optical characteristics of an optical system. The optical characteristics switching mechanism rotates the holder with use of a magnetic force to selectively arrange an optical element in an optical path between the laser beam emitting section and the objective lens of the optical system, wherein a holder holding the optical element is arranged selectively at one of a first position at which the optical element exists in the optical path and a second position at which the optical element is out of the optical path.

The present invention also relates to an optical disk apparatus having a driver for rotating an optical disk and an optical head for recording/reproduction of a signal in/from the optical disk being rotated by the driver. The optical head includes a laser beam emitting section, an objective lens for converging the laser beam emitted by the laser beam emitting section to make the converged laser beam incident on an optical disk, a photodetecting section for receiving a laser beam reflected from the optical disk through the objective lens, and an optical characteristics switching mechanism for switching optical characteristics of an optical system by selectively arranging an optical element in an optical path between the laser beam emitting section and the objective lens of the optical system. The optical characteristics switching mechanism has an optical characteristics switching member for rotating the holder with use of a magnetic force to arrange a holder holding the optical element selectively at one of a first position at which the optical element exists in the optical path and a second position at which the optical element is out of the optical path.

According to the above-mentioned structures, the holder holding the optical element to move the optical element to either of the position at which the optical element exists in the optical path and the position at which the optical element is out of the optical path. Such structures are simple and do not require a large space, and thus can reduce the apparatus in size.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[First embodiment]

Figure 1:
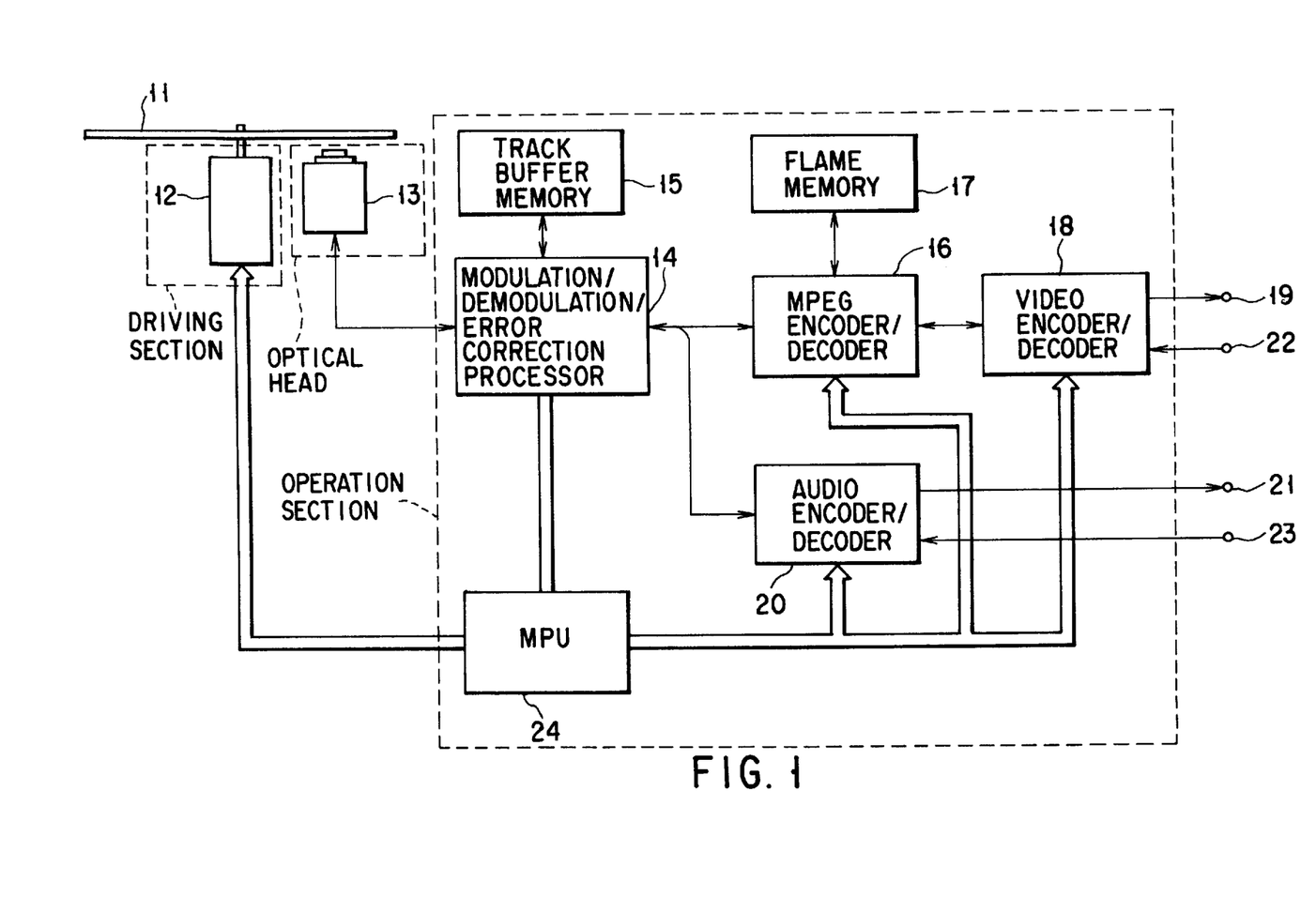
FIG. 1 is a block diagram of an optical disk apparatus according to a first embodiment of the present invention, which is provided for explaining the structure of the optical disk apparatus.

A first embodiment of the present invention will be described below in detail with reference to the accompanying drawing. FIG. 1 shows an example of an optical disk apparatus for reproducing/recording image data and/or audio data from/in the optical disk, which has an optical head device. The optical disk apparatus comprises: a driving section for rotating the optical disk, an optical head for irradiating the rotating optical disk with a laser beam and detecting a reflection light beam reflected by the optical disk, and an operation section for processing a signal detected by the optical head so as to be converted to a desired form of data.

In FIG. 1, 11 denotes an optical disk. The optical disk 11 is rotated by a driving motor 12.

An optical head 13 is disposed to face a signal recording face of the optical disk 11. The optical head 13, which is intended to selectively read/write data from/in the optical disk 11 by irradiating a signal recording face of the optical disk 11 with a laser beam, is supported so as to move in a direction of a diameter of the optical disk 11.

The operation of the operation section will be described. The operation section has at least the function of supplying signals read by the optical head to a given device in such a manner that the signals can be processed by that device. In the first embodiment, the operation section has a function of reproducing the moving picture information and sound information from the optical disk.

The data read from the optical disk 11 by the optical head 13 is transferred to a modulation/demodulation/error correction processor 14. The modulation/demodulation/error correction processor 14 executes the modulation/demodulation/error correction of the data transferred from the optical head 13, by using a track buffer memory 15.

Among the data output from the modulation/demodulation/error correction processor 14, the image data is supplied to an MPEG (Moving Picture image coding Experts Group) encoder/decoder 16. The MPEG encoder/decoder 16 executes MPEG decoding of the image data supplied from the modulation/demodulation/error correction processor 14, by using a frame memory 17.

The image data processed by the MPEG encoder/decoder 16 is supplied to a video encoder/decoder 18 to be subjected to video decoding, then output from an output terminal 19. While, the audio data included in the data output from the modulation/demodulation/error correction processor 14 is supplied to an audio encoder/decoder 20 to be subjected to audio decoding, then output from an output terminal 21.

Next, the recording operation of the optical disk apparatus will be described below. The image data supplied to an input terminal 22 is input into the video encoder/decoder 18 to be subjected to video encoding, and supplied to the MPEG encoder/decoder 16. The MPEG encoder/decoder 16 executes MPEG encoding of the image data processed by the video encoder/decoder 18, with use of the frame memory 17.

While, the audio data supplied to an input terminal 23 is input into the audio encoder/decoder 20 to be subjected to audio encoding. After the audio encoding, the image data output from the MPEG encoder/decoder 16 and the audio data output from the audio encoder/decoder 20 are supplied to the modulation/demodulation/error correction processor 14.

The modulation/demodulation/error correction processor 14 executes the modulation for recording and the error correction signal addition processing of the supplied image data and audio data, by using the track buffer memory 15. The data output from the modulation/demodulation/error correction processor 14 is recorded in the optical disk 11 through the optical head 13.

The disk motor 12, the modulation/demodulation/error correction processor 14, the MPEG encoder/decoder 16, the video encoder/decoder 18, and the audio encoder/decoder 20, which are used for the above-mentioned processes are all controlled by an MPU (Micro Processing Unit).

Figure 2:
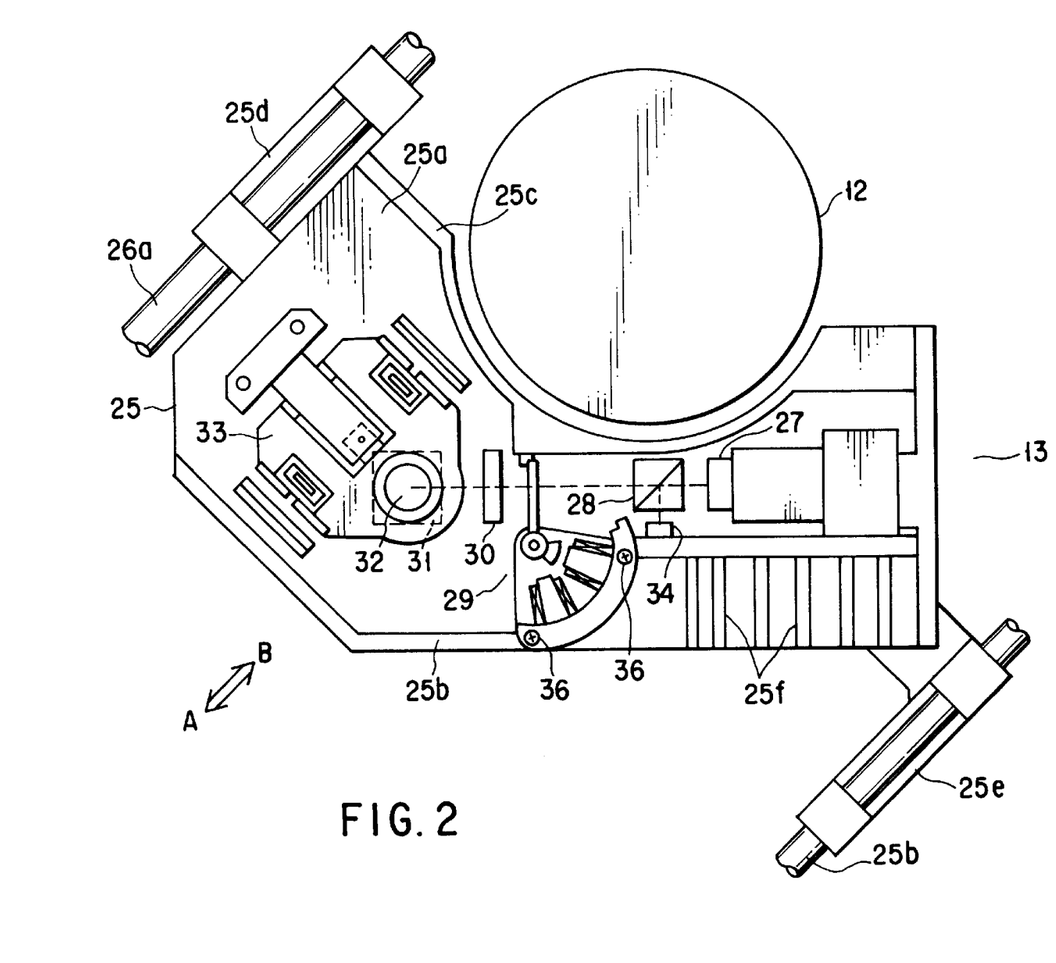
FIG. 2 is a plane view of the optical disk apparatus according to the first embodiment of the present invention, which is provided for explaining the structure of the optical disk apparatus.

The structure of the optical head 13 will be described in detail with reference to FIG. 2. The optical head 13 has a head body 25 formed in a plane shape which bends to surround the disk motor 12. The head body 25 has a bottom plate 25a, and side plates 25b and 25c stand at substantially right angles to the bottom plate 25a on both bending sides of the bottom plates 25a. The head body 25 is provided with arms 25d and 25e respectively formed integrally with corresponding one of ends of the bending sides of the head body 25. The arms 25d and 25e are slidably supported respectively by corresponding one of guide rails 26a and 26b which are fixed in parallel with each other to dispose the rotation axis of the disk motor 12 in the midst thereof. With such a structure, the head body 25 can be moved in directions of the diameter of the optical disk 11, i.e., directions indicated by arrows A and B.

The portion surrounded by the bottom plate 25a and the side plates 25b and 25c contains various optical components: a semiconductor laser device 27, a beam splitter 28, an optical characteristics switching mechanism 29 which will be described in detail later, a collimator lens 30, a mirror 31, an objective lens 32, an objective lens supporting mechanism 33 for supporting the objective lens 32, and a photodetector having photoelectric conversion function.

With such a structure, the head body 25 moves together with the disk motor 12 along a line connecting an optical center of the objective lens 32 and a rotation center of the disk motor 12. The semiconductor laser 27 has a laser diode for emitting a laser beam having a wavelength of 780 nm for reproducing/recording data stored in a DVD.

The laser beam emitted by the semiconductor laser 27 passes through the beam splitter 28 along a straight line to be input into the optical characteristics switching mechanism 29, and is turned into parallel light beams by the collimator lens 30. The parallel light beams are then reflected at right angles by the mirror 31 to be converged on a signal recording face of the optical disk 11 through the objective lens 32.

The light beam is reflected by the optical disk 11 to pass through the optical path in a reverse order to that described above: the objective lens 32, the mirror 31, the collimator lens 30, and the optical characteristics switching mechanism 29 to turn at the beam splitter 28 at substantially right angle, and then received by a photodetector 34.

The head body 25 is formed from non-magnetic substance such as synthetic resin or aluminum, and provided with a plurality of heat-radiating fins 25f on the side of the semiconductor laser device 27 at an outer periphery of the body 25.

The objective lens supporting mechanism 33 supports the objective lens 32 such that the objective lens 32 can move in the direction of the optical axis (i.e., the focusing direction) of the objective lens 32 or in the direction of the diameter of the optical disk 11 (i.e., the tracking direction), thereby controls the focusing/tracking of the objective lens 32.

Figure 8:
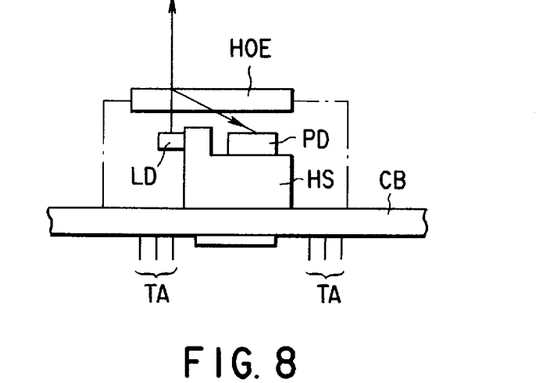
FIG. 8 shows an example of an optical head apparatus that is fabricated as a unit.

The semiconductor laser 27, the beam splitter 28 and the photodetector 34 can be integrally formed as one module. For example, the IOU (Integrated Optical Unit) shown in FIG. 8 is obtained by arranging a semiconductor laser LD and a photodetector PD on a ceramic wiring board (CB). A holographic optical element (HOE) is arranged at the laser input/output port. In FIG. 8, HS denotes a heat sink, and TA denotes a group of terminals.

A laser beam emitted from the semiconductor laser LD is first transmitted through the holographic optical element HOE and then incident on the optical disk. After being reflected by the optical disk, the laser beam is incident again on the holographic optical element HOE. At this time, the laser beam is diffracted by the holographic optical element HOE, and the diffracted laser beam is incident on the optical detector PD.

Since, in this manner, the optical elements are fabricated and assembled as a unit, a positioning error among smallsized components need not be taken into account when the optical head device is fabricated. In addition, since the optical system can be made compact in size, the optical head device and the optical disk apparatus can also be small.

Figure 3A:
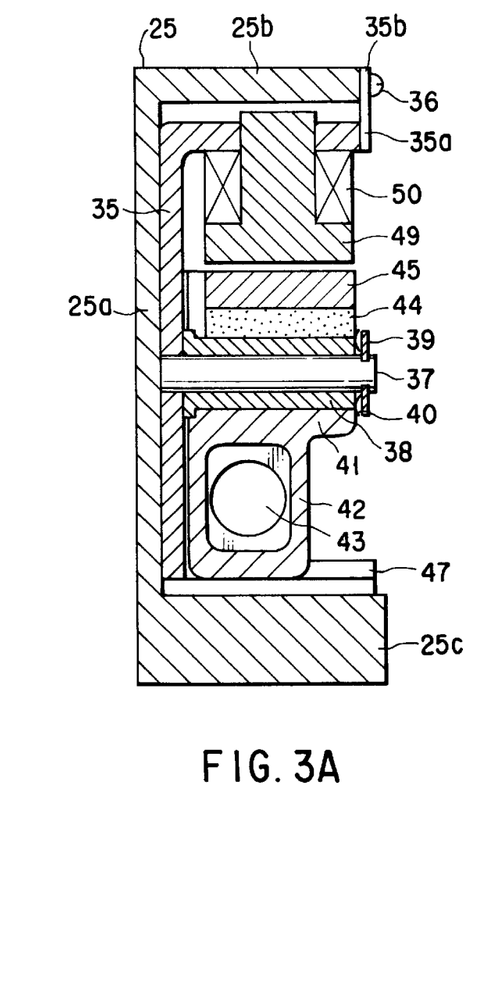
FIGS. 3A, 3B and 3C are views for explaining the structure of an optical characteristic switching mechanism according to the first embodiment of the present invention.

Next, the structure of the optical characteristics switching mechanism 29 will be described in detail with reference to FIG. 3A and FIG. 3B. FIG. 3A is a sectional view of the optical characteristics switching mechanism 29 taken along a line 3A—3A. In the optical characteristics switching mechanism 29, the bottom plate 25a of the head body 25 contacts with a base plate 35 formed from non-magnetic substance in a plate-like shape. The side of the base plate 35, which is opposite to the side plate 25b of the head body 25, is formed in an arc shape to correspond to the shape of the bending side of the side plate 25b. The arc side of the base plate 35 is provided with a side plate 35a formed from non-magnetic substance (aluminum) and disposed parallel with the side plate 25b of the head body 25, which is integrally formed with the arc side of the base plate 35.

At the distal end of the side plate 35a of the base plate 35, a brim 35b is provided to close an opening of the side plate 25b of the head body 25. By inserting a screw 36 into the brim 35b to fix the brim 35b to the side plate 25b of the head body 25, the base plate 35 is fixed to the head body 25.

At the substantially central portion of the base plate 35, a shaft 37 formed in a column-shape is provided so as to stand at right angles to the face of the base plate 35. The shaft 37 is provided with a rotating body 38 formed from oilless metal or the like in a substantially cylindrical shape, which covers the shaft 37 to rotate around the central axis of the shaft 37.

The rotating body 38 is urged toward the base plate 35 by a washer 39 fixed to a distal end of the shaft 37 and a clamp 40 having flexibility, thereby prevented from shaking in the direction of the central axis thereof and coming off the shaft 37.

The rotating body 38 is provided on the outer wall with a supporting body 41 formed in a substantially column-shape. The supporting body 41 is formed to be rotated integrally with the rotating body 38. The supporting body 41 is provided at a part of its outer periphery with a lens holder 42 radially protruding from the supporting body 41. The lens holder 42 holds an optical lens 43. The lens holder 42 may be provided therein an optical path length correction means, such as a concave lens, a convex lens, a hologram lens, or a glass plate.

With such a structure, when the supporting body 41 is rotated, the optical lens 43 is selectively located in an optical path connecting the beam splitter 28 and the collimator lens 30, thereby the optical characteristics of the optical head can be switched.

The supporting body 41 has a cut-away portion which is formed in a longitudinal direction of the shaft 37 at a portion of the outer periphery other than where the lens holder 42 is formed in. The cut-away portion is provided with a back yoke 44 inserted therein. At the outer periphery of the back yoke 44, a permanent magnet 45 is attached. The back yoke 44 and the permanent magnet 45 are rotated integrally with the supporting body 41.

Figure 3B:
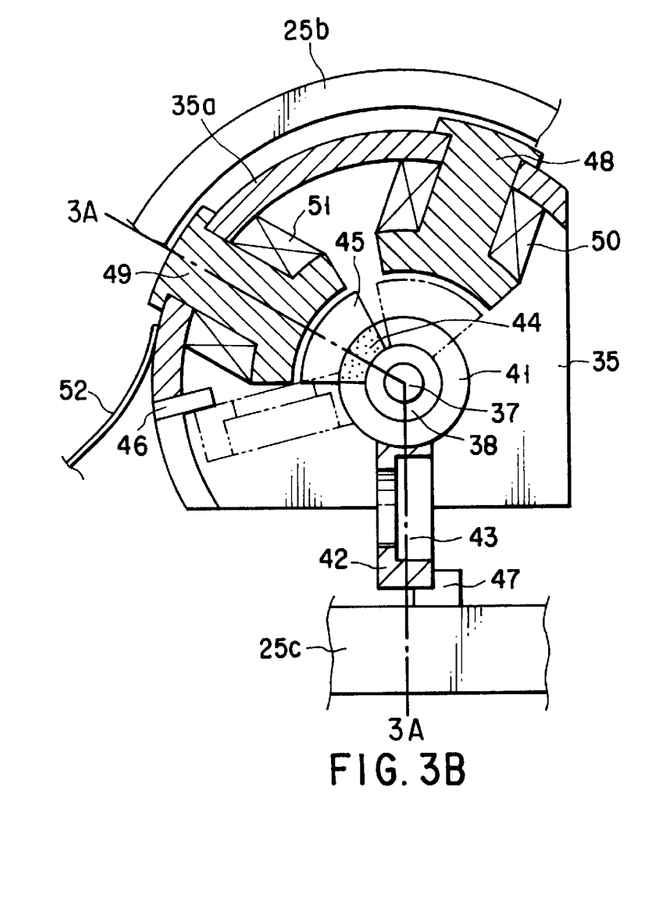

The base plate 35 is provided with a stopper 46 with which the lens holder 42 is brought into contact when the supporting body 41 as shown in FIG. 3B is rotated clockwise. When the lens holder 42 is brought into contact with the stopper 46 in this manner, the optical lens 43 is stably out of the optical path connecting the beam splitter 28 and the collimator lens 30.

The other side plate 25c of the head body 25 is also provided with a stopper 47 with which the lens holder 42 is brought into contact when the supporting body 41 shown in FIG. 3B is rotated counterclockwise. When the lens holder 42 contacts with the stopper 47 in this manner, the optical lens 43 stably exists in the optical path connecting the beam splitter 28 and the collimator lens 30.

The side plate 35a formed on the base plate 35 is provided with a stator yoke 48 at a position at which the stator yoke 48 receives the permanent magnet 45 when the lens holder 42 is brought into contact with the stopper 46. The side plate 35a formed on the base plate 35 is provided with a stator yoke 49 at a position at which the stator yoke 49 receives the permanent magnet 45 when the lens holder 42 is brought into contact with the stopper 47.

The stator yokes 48 and 49 are respectively provided with coils 50 and 51 formed therearound. The coils 50 and 51 are formed by winding one wire around the stator yokes 48 and 49 such that their winding directions are opposite to each other. In other words, the coils 50 and 51 are connected in series by one wire. The wire forming the coils 50 and 51 is connected at both ends to a flexible printed wiring board 52 to which a driving current generated by a driving circuit described later is supplied.

With such a structure, when a driving current is made to flow into the coil 51 in a direction to generate in the stator yoke 49 a magnetic field in which a repulsion force is exerted to the permanent magnet 45 in a condition where the permanent magnet 45 is located at a position described by a real line in FIG. 3B, the driving current normally makes the coil 50 generate in the stator yoke 48 the magnetic field, in which an attractive force is exerted to the permanent magnet 45.

In this time, the supporting body 41 is rotated clockwise in FIG. 3B, and stopped in the position at which the lens holder 42 is brought into contact it the stopper 46. The driving current flowing through the coils 50 and 51 is stopped immediately before the lens holder 42 is brought into contact with the stopper 46 or stopped after suppressing the rotation of the lens holder 42 by switching the polarities of the driving current.

The positional relationship between the stator yoke 48 and the permanent magnet 45 is set such that the attractive force for attracting the stator yoke 48 functions to rotate the supporting body 41 clockwise in FIG. 3B in a condition where the lens holder 42 contacts with the stopper 46. In this manner, the lens holder 42 is kept at the position at which the optical lens 43 is stably set out of the optical path while the lens holder 42 is pressed by the stopper 46.

In such a stable state, when a driving current is made to flow into the coil 50 in the direction to generate a magnetic field in the stator yoke 48 which exerts a repulsion force to the permanent magnet 45, i.e., a driving current having a polarity opposite to the above-mentioned driving current flows into the coil 50, the driving current normally functions to make the coil 51 generate in the stator yoke 49 the magnetic field which exerts an attractive force to the permanent magnet 45.

In this time, the supporting body 41 is rotated counterclockwise in FIG. 3B, and stopped in the position in which the lens holder 42 is brought into contact with the stopper 47. In this case, it is preferable for elongating the lifetime of this mechanism that the driving current flowing into the coils 50 and 51 is stopped immediately before the lens holder 42 is brought into contact with the stopper 47 or stopped after suppressing the rotation of the lens holder 42 by switching the polarity of the driving current such that the shock to be applied to the lens holder 42 in contacting with the stopper is suppressed.

The positional relationship between the stator yoke 49 and the permanent magnet 45 is set such that the attractive force of the permanent magnet 45 for attracting the stator yoke 49 functions to rotate the supporting body 41 counterclockwise in FIG. 3B in the condition where the lens holder 42 contacts with the stopper 47. When the lens holder 42 is in contact with the stopper 47, the permanent magnet 45 is slightly shifted clockwise from the stator yoke 49. Since the permanent magnet 45 is arranged in this manner, the lens holder 42 is kept at the position at which the optical lens 43 stably exists in the optical path, in the state where the lens holder 42 is pressed by the stopper 47. The lens holder 42 is allowed to move toward to the other stator yoke 48, when the coil 51 is supplied with a current that causes the stator yoke 49 to assume the same polarity as the permanent magnet 54.

Figure 4:
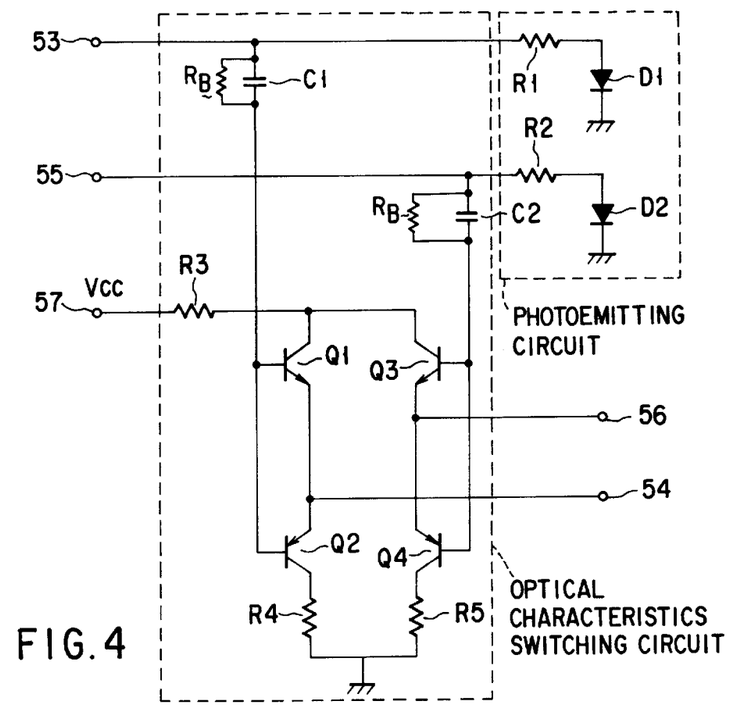
FIG. 4 is a circuit diagram for showing a driving circuit for driving the optical characteristic switching mechanism.

Next, a driving circuit for making a driving current with a desired polarity flow into the coil 50 or 51 will be described with reference to a circuit diagram shown in FIG. 4. An input terminal 53 is supplied with a CD detection signal which is set at a L (Low) level in a normal time, and set at a H (High) level when a CD as the optical disk 11 is put on the apparatus.

The input terminal 53 is grounded via a resistor R1 and a laser diode D1 for emitting a CD reproducing/recording laser beam with a wavelength of 780 nm and having a polarity as shown in the circuit diagram, which are connected in series. The input terminal 53 is, on the other hand, connected to a base of a N-P-N transistor Q1 and a base of a P-N-P transistor Q2 via a capacitor C1. Emitters of the transistors Q1 and Q2 are connected in common. The connecting point of the emitters is connected to one end of the wire constituting the coils 50 and 51 via a connection terminal 54.

On the other hand, an input terminal 55 is supplied with a DVD detection signal which is set at a L level in the normal time, and set at a H level when a DVD as an optical disk 11 is put on the apparatus. The input terminal 55 is grounded via a resistor R2 and a laser diode D2 for emitting a DVD reproducing/recording laser beam with a wavelength of 650 nm and having a polarity as shown in the circuit diagram, which are connected in series. The input terminal 55 is connected to a base of a N-P-N transistor Q3 and a base of a P-N-P transistor Q4 via a capacitor C2. Emitters of the transistors Q3 and Q4 are connected in common. The connecting point of the emitters is connected to another end of the wire constituting the coils 50 and 51 via a connection terminal 56.

The transistors Q1 and Q3 are connected to each other at the collectors, and the connecting point of the collectors is connected to a power supply 57 from which a direct voltage Vcc is applied to the transistors via a resistor R3. While, collectors of the transistors Q2 and Q4 are grounded via a resistors R4 and R5.

With the above-mentioned constitution, when a CD as the optical disk 11 is put in the apparatus, the input terminal 53 is supplied with the CD detection signal with a H level by a detection apparatus (not shown), the laser diode D1 is thereby made conductive to emit a laser beam and the transistors Q1 and Q4 are turned on to enable a driving current flow through the resistor R3, the transistor Q1, the connection terminal 54, the coils 50 and 51, the connection terminal 56, the transistor Q4 and the resistor R5 when the switching operation has finished, and the capacitor C1 is charged, thereby an electric current flows into only the laser diode D1.

Similarly, when a DVD as the optical disk 11 is put in the apparatus, the input terminal 55 is supplied with the DVD detection signal with a H level by the detection apparatus not shown in the drawing, The laser diode D2 is thereby turned on to emit a laser beam and the transistors Q3 and Q2 are made conductive to enable a driving current having an opposite polarity to that of the driving current in the CD reproduction flow through the resistor R3, the transistor Q3, the connection terminal 56, the coils 51 and 50, the connection terminal 54, the transistor Q2, and the resistor R4 when the switching operation has finished, and the capacitor C2 is charged, thereby an electric current flows into only the laser diode D2.

The capacitors C1 and C2 are provided with a discharge resistor $R_B$ in parallel with the capacitors. The resistance value of the discharge resistor $R_B$ is quite larger than that of the photoemitting circuit, and thus only a negligibly small current not enough to drive the optical characteristics switching circuit flows through the discharge resistor $R_B$ during the recording/reproduction of data in/from the optical disk 11. When the recording/reproduction has finished and the power supply is stopped, the charges stored in the capacitors C1 and C2 are discharged through the discharge resistor $R_B$.

According to the above-mentioned embodiment, the lens holder 42 is rotated to move the optical lens 43 to the position at which the optical lens 43 exists in the optical path or the position at which the optical lens 43 is out of the optical path. Such a simple structure does not need so large space, and thus can reduce the optical head in size.

In addition, one of the stator yokes 48 and 49 is made to generate a repulsion force repelling the permanent magnet 45 and another one of the stator yokes 49 and 48 is made to generate an attractive force attracting the permanent magnet 45 in order to rotate the supporting body 41. The coils 50 and 51 thus need not to be supplied with the driving current all the time, which will reduce the power consumption. Moreover, with this structure, unnecessary elements can be located out of the optical path if desired, and thus a part of the optical characteristics of the device can be prevented from being deteriorated.

Further, even if the optical disk apparatus is turned off, the permanent magnet 45 continues to attract the stator yoke 48 or 49 to press the lens holder 42 to the stopper 46 or 47, thereby undesirable movement of the optical lens 43 can be prevented.

Figure 3C:
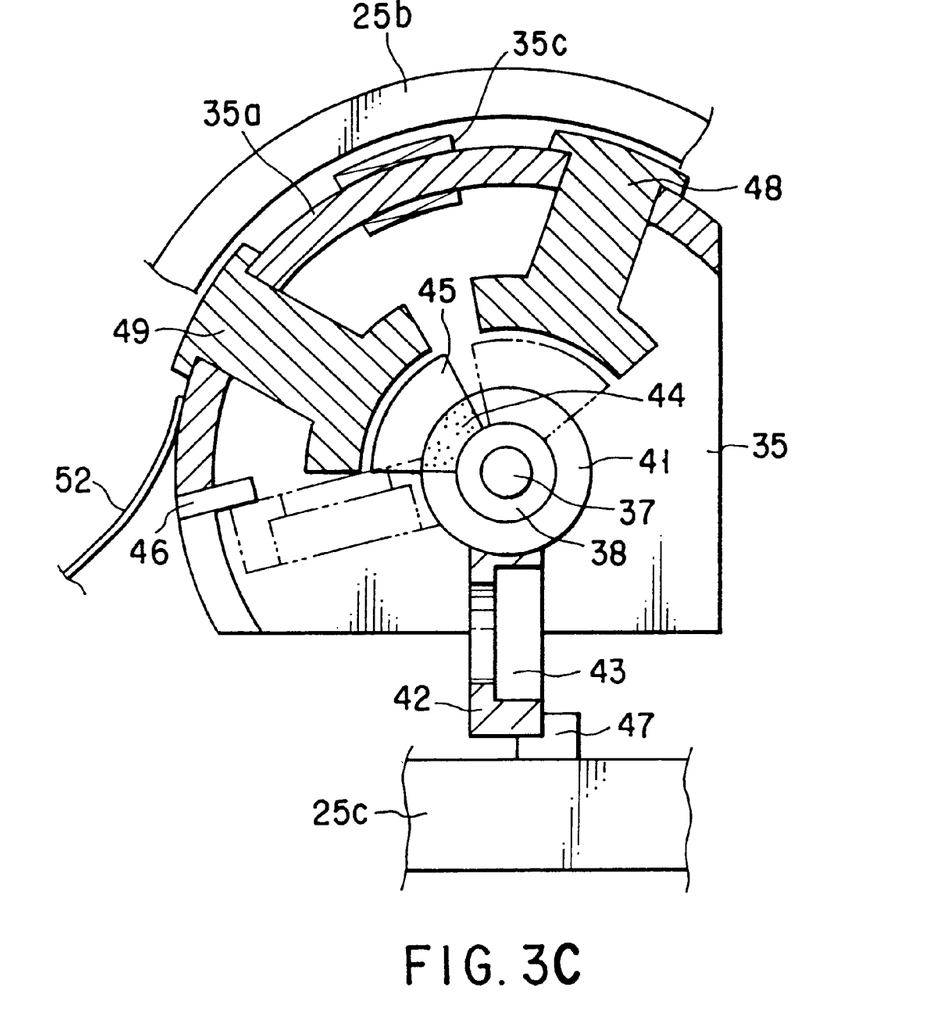

The effect attained by the above-described optical characteristics switching mechanism having the structures shown in FIGS. 3A and 3B can be also attained by an optical characteristics switching mechanism having a structure shown in FIG. 3C. The optical characteristics switching mechanism shown in FIG. 3C is characterized in that the optical characteristics can be switched by using one coil.

More specifically, in the mechanism shown in FIG. 3C, the side plate 35a of the base plate 35 is formed from magnetic substance, around which a coil 35c is formed. Also with such a structure, the stator yoke 48 or 49 can generate a magnetic field different in polarity merely by switching the polarity of the current flowing into the coil, thereby switch the position of the lens holder 42. In this case, the stator yokes 48 and 49 constitute part of one magnetic path.

[Second embodiment]

Figure 5:
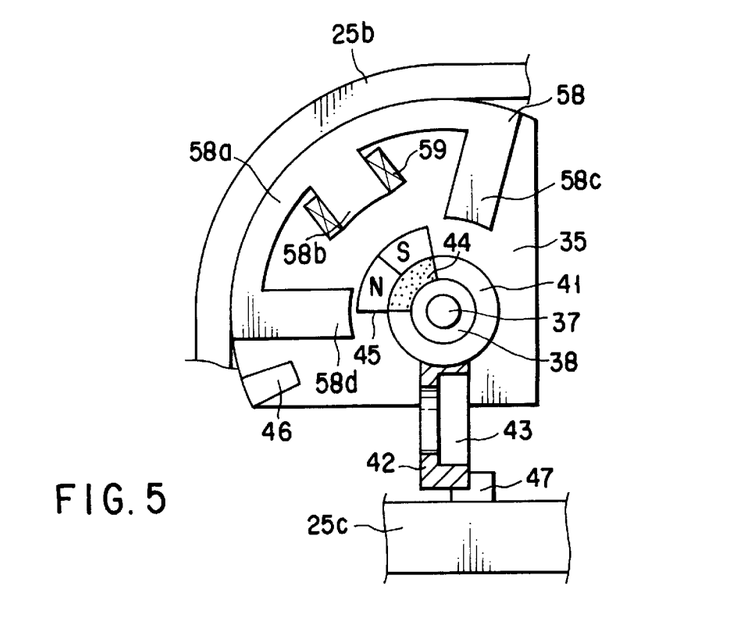
FIG. 5 is a view of the optical disk apparatus according to a second embodiment of the present invention, which is provided for explaining the structure of the optical disk apparatus.

FIG. 5 shows the optical disk apparatus according to a second embodiment of the present invention. In FIG. 5, the members shown in FIG. 3B are denoted by the same reference numerals as denoted in FIG. 3B. In the second embodiment shown in FIG. 5, the stator yokes 48 and 49 used in the first embodiment are constituted as one member, i.e., a stator yoke 58.

The stator yoke 58 comprises: a bending portion 58a formed on the arc side of the base plate 35 to be along therewith; a central end portion 58b; and formed to protrude toward the shaft 37 from the substantially central portion of the bending portion 58a and provided on a side wall thereof with a coil 59 winding the central end portion 58b, side end portions 58c and 58d formed to protrude toward the shaft 37 from both ends of the bending portion 58a: all of which are integrally formed from magnetic substance. The central end portion 58b is separated from the permanent magnet 45 in comparing with the side end portions 58c and 58d.

In the stator yoke 58, all the protruding ends of the central end portion 58b and the side end portions 58c and 58d are spaced at intervals so as to all face the permanent magnet 45. With this structure, in a condition where the lens holder 42 contacts with the stopper 47, the S pole of the permanent magnet is arranged to face the side end portion 58c such that the S pole is a little close to the side end portion 58c with respect to the central end portion 58b. In a condition where the lens holder 42 contacts with the stopper 46, the N pole of the permanent magnet is arranged to face the side end portion 58d such that the N pole is a little close to the side end portion 58d with respect to the central end portion 58b. The side end portions 58c and 58d are arranged to face the permanent magnet 45 such that the side end portion 58c or 58d is located a little right/left of the permanent magnet 45 when the lens holder 42 contacts with the stopper 46 or 47.

The stator yoke 58 constituted as above is fixed to the base plate 35 by adhesive, a screw, or the like. The base plate 35 is fixed to the bottom plate 25a of the head body 25 by adhesive, a screw, or the like. The permanent magnet 45 has an N pole region and an S pole region which are disposed to be apart from each other in right and left regions in the rotating direction of the supporting body.

As shown in FIG. 5, in a condition where the lens holder 42 contacts with the stopper 47, the N pole region of the permanent magnet 45 attracts the side end portion 58d of the stator yoke 58, which rotates the supporting body 41 counterclockwise in FIG. 5. With such a structure, the lens holder 42 is kept at the stable position at which the optical lens 43 exists in the optical path while the lens holder 42 is pressed to the stopper 47.

In this state, when a driving current is made to flow into the coil 59 in order to make the stator yoke 58 generate a magnetic field wherein the protruding end portion of the central end portion 58b serves as an S pole, the protruding end portions of the side end portions 58c and 58d serve as a N pole, normally. The supporting body 41 is rotated clockwise in FIG. 5, and stopped at the position at which the lens holder 42 is brought into contact with the stopper 46.

In a condition where the lens holder 42 contacts with the stopper 46, the S pole region of the permanent magnet 45 attracts the side end portion 58c of the stator yoke 58, which rotates the supporting body 41 clockwise in FIG. 5. With such a structure, the lens holder 42 is kept at the stable position at which the optical lens 43 is out of the optical path while the lens holder 42 is pressed to the stopper 46.

In this state, when a driving current is made to flow into the coil 59 in order to make the stator yoke 58 generate a magnetic field wherein the protruding end portion of the central end portion 58b serves as an N pole, the protruding end portion of the side end portions 58c and 58d serve as a S pole, normally. The supporting body 41 is rotated counterclockwise in FIG. 5, and stopped at the position at which the lens holder 42 is brought into contact with the stopper 47.

As described above, also with the structure shown in the second embodiment, the optical lens 43 can be moved to the position at which the optical lens 43 exists in the optical path or the position at which the optical lens 43 is out of the optical path, and thus the same effect as attained in the first embodiment can be attained.

[Third embodiment]

Figure 6A:
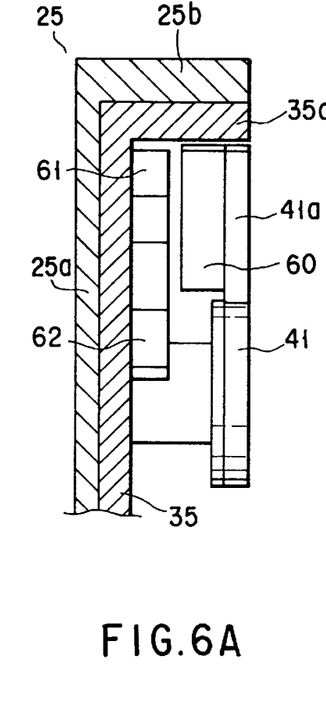
FIGS. 6A and 6B are views for explaining the structure of an optical characteristic switching mechanism according to a third embodiment of the present invention.
Figure 6B:
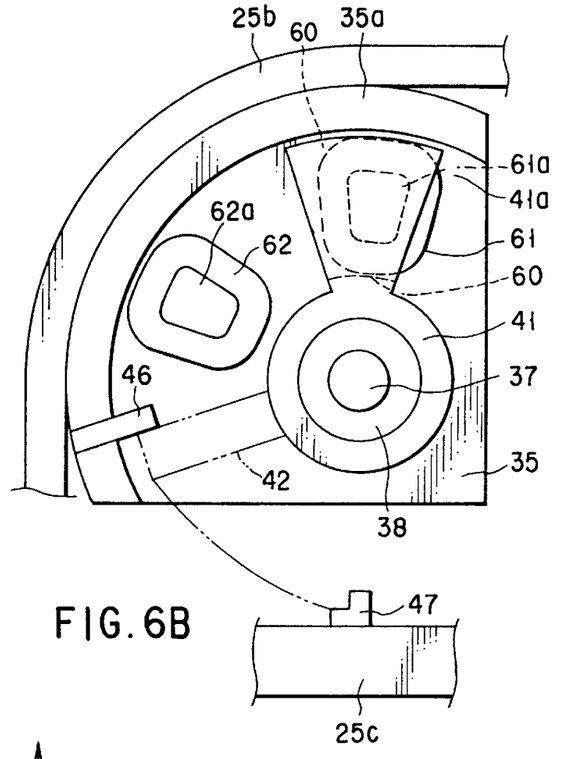

FIGS. 6A and 6B show a third embodiment of the present invention. In the third embodiment, a substantially arc-shaped supporting portion 41a is formed on an outer periphery of the supporting body 41 to face the plate face of the base plate 35, and a permanent magnet 60 is attached to a face of the supporting portion 41a, which faces the base plate 35.

On the face plate of the base plate 35, coils 61 and 62 are disposed to face the permanent magnet 60 when the lens holder 42 contacts with corresponding one of the stoppers 46 and 47. The coils 61 and 62 are formed by winding one wire onto two iron cores 61a and 62a thereof in directions opposite to each other.

As shown in FIG. 6B, in a condition where the lens holder 42 contacts with the stopper 46, the permanent magnet 60 attracts the iron core 61a of the coil 61, which rotates the supporting body 41 counterclockwise in FIG. 6B. With such a structure, the lens holder 42 is kept at the stable position at which the optical lens 43 is out of the optical path while the lens holder 42 is pressed to the stopper 46.

With such a structure, if the driving current is made to flow into the coil 61 in a direction to generate a magnetic field in which a repulsion force is exerted to the permanent magnet 60, the driving current normally functions to make the coil 62 generate the magnetic field in which an attractive force is exerted to the permanent magnet 60. In this time, the supporting body 41 is rotated counterclockwise in FIG. 6B, and stopped at the position at which the lens holder 42 is brought into contact with the stopper 47.

On the other hand, in a condition where the lens holder 42 contacts with the stopper 47, the permanent magnet 60 attracts the iron core 62a of the coil 62, which rotates the supporting body 41 counterclockwise in FIG. 6B. With such a structure, the lens holder 42 is kept at the stable position at which the optical lens 43 exists in the optical path while the lens holder 42 is pressed to the stopper 47.

With such a structure, if the driving current is made to flow into the coil 62 in a direction to generate a magnetic field in which a repulsion force is exerted to the permanent magnet 60, the driving current normally functions to make the coil 61 generate the magnetic field in which an attractive force is exerted to the permanent magnet 60. In this time, the supporting body 41 is rotated clockwise in FIG. 6B, and stopped at the position at which the lens holder 42 is brought into contact with the stopper 46.

Accordingly, also with the structure shown in the third embodiment, the optical lens 43 can be moved to the position at which the optical lens 43 exists in the optical path or the position at which the optical lens 43 is out of the optical path, and thus the same effect as attained in the aforementioned embodiments can be attained.

[Fourth embodiment]

Figure 7A:
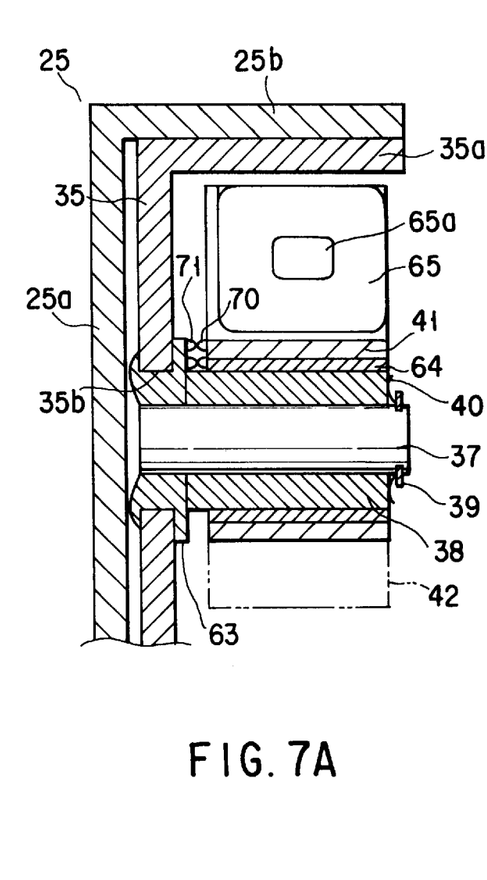
FIGS. 7A and 7B are views for explaining the structure of an optical characteristic switching mechanism according to a fourth embodiment of the present invention.
Figure 7B:
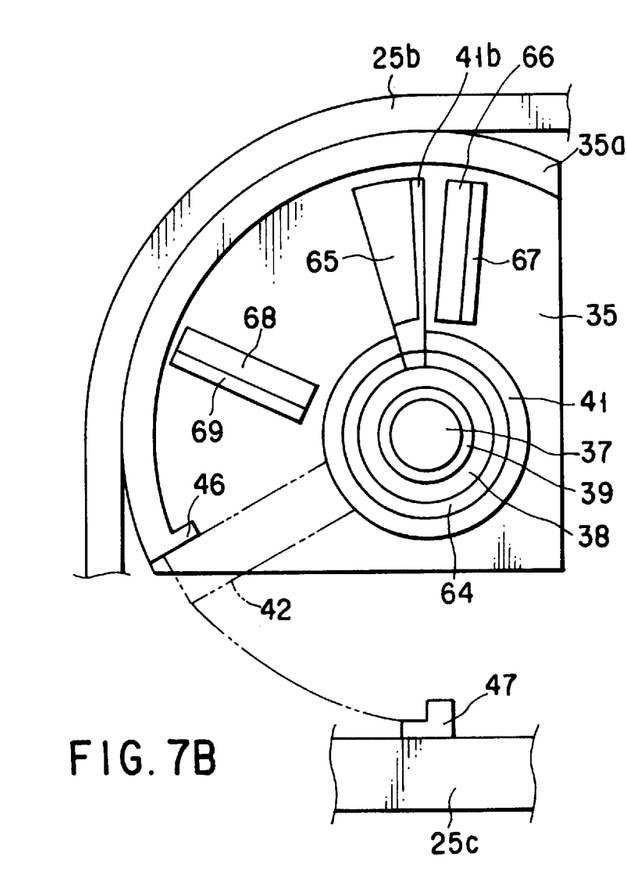

FIGS. 7A and 7B shows the fourth embodiment of the present invention. In a through hole 35b formed in the base plate 35, a ring-shaped supporting member 63 is inlaid and caulked. Into the ring-shaped supporting member 63, one end portion of the shaft 37 is inserted.

The rotating body 38 is formed around the outer periphery of the shaft 37. The rotating body 38 is covered with a pipe 64, and the supporting body 41 is put thereon. With this structure, the rotating body 38, the pipe 64, and the supporting body 41 are integrally rotated around the shaft 37.

The supporting body 41 is provided on a part of the outer periphery thereof with a supporting plate 41b which is arranged at a substantially right angle to the plate face of the base plate 35. The supporting plate 41b supports a coil 65 formed of an iron core wound by a wire.

On the plate face of the base plate 35, a permanent magnet 66 and a back yoke 67 thereof are arranged to face the coil 65 when the lens holder 42 contacts with the stopper 46. The plate face of the base plate 35 is also provided with a permanent magnet 68 and a back yoke 69 thereof which face the coil 65 when the lens holder 42 contacts with the stopper 47.

As shown in FIG. 7B, in a condition where the lens holder 42 contacts with the stopper 46, the permanent magnet 66 attracts the iron core 65a of the coil 65, which rotates the supporting body 41 clockwise in FIG. 7B. With such a structure, the lens holder 42 is kept at the stable position at which the optical lens 43 is out of the optical path while the lens holder 42 is pressed to the stopper 46.

With such a structure, if a driving current is made to flow into the coil 65 in a direction to generate a magnetic field in which a repulsion force is exerted to the permanent magnet 66, the supporting body 41 is rotated counterclockwise in FIG. 7B, and stopped at the position at which the lens holder 42 is brought into contact with the stopper 47.

As described above, in a condition where the lens holder 42 contacts with the stopper 47, the permanent magnet 68 attracts the iron core 65a of the coil 65, which rotates the supporting body 41 counterclockwise in FIG. 7B. With such a structure, the lens holder 42 is kept at the stable position at which the optical lens 43 exists in the optical path while the lens holder 42 is pressed to the stopper 47.

With such a structure, if the driving current is made to flow into the coil 62 in a direction to generate a magnetic field in which a repulsion force is exerted to the permanent magnet 60, the driving current normally functions to make the coil 65 generate the magnetic field in which an attractive force is exerted to the permanent magnet 68.

In this time, the supporting body 41 is rotated clockwise in FIG. 7B, and stopped at the position at which the lens holder 42 is brought into contact with the stopper 46.

Accordingly, also with the structure shown in the fourth embodiment, the optical lens 43 can be moved to the position at which the optical lens 43 exists in the optical path or the position at which the optical lens 43 is out of the optical path, and thus the same effect as attained in the aforementioned embodiments can be attained.

Both ends of the wire constituting the coil 65 are connected to a pair of sliding terminals 70 exposed at the end portion of the pipe 64 and the supporting body 41, as shown in FIG. 7A. The pair of the sliding terminals 70 contact with a pair of connection patterns 71 formed in arc rails along the rotation locus of the sliding terminals 70. With this structure, wherever on the rotation path the supporting body 41 is located, the sliding terminals 70 are constantly contact with the connection patterns 71, and thus the coil 65 can be supplied with a driving current.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An optical head comprising:

laser beam emitting section;

an objective lens for converging the laser beam emitted by the laser beam emitting section to make the converged laser beam incident on an optical disk;

a photodetecting section for receiving a laser beam reflected by the optical disk through the objective lens;

an objective lens supporting mechanism holding the objective lens such that at least focusing of lens is allowed to be controlled;

an optical element different from the objective lens;

a holder for the optical element;

an optical characteristics switching mechanism for rotating the holder about axis extending in a direction substantially perpendicular to a direction in which the laser beam passes through the optical element, whereby the optical element is moveable movable between a first position where the optical element is located in an optical path of the laser beam and a second position where the optical element is out of the optical path beam.

2. An optical head according to claim 1, wherein the optical characteristics switching member includes a permanent magnet rotated integrally with the holder;

a stator yoke for exerting a magnet force to the permanent magnet at one of the first and second positions; and a coil for making the stator yoke generate a magnetic field.

3. An optical head according to claim 1, the optical characteristics switching member including a first stopper which contacts the holder to stop rotation of the holder when the holder is rotated from the first position to the second position; and a second stopper which contacts with the holder to stop rotation of the holder when the holder is rotated from the second position to the first position, wherein the permanent magnet, the stator yoke, and the first and the second stoppers are positioned so that a force of the permanent magnet, which attracts the stator yoke, exerts pressure on the holder to the first stopper when the holder is arranged on a side of the first stopper, and the force of the permanent magnet, which attracts the stator yoke, exerts pressure on the holder to the second stopper when the holder is arranged on a side of the second stopper.

4. An optical head according to claim 1, wherein the optical characteristics switching member includes a permanent magnet rotated integrally with the holder;

a first stator yoke facing the permanent magnet when the holder is located at the first position;

a first coil for making the first stator yoke generate a magnetic filed;

a second stator yoke facing the permanent magnet when the holder is located at the second position; and a second coil for making the second stator yoke generate a magnetic filed.

5. An optical head according to claim 1, wherein the optical characteristics switching member includes a permanent magnet rotated integrally with the holder and magnetized such that its polarity is inverted in accordance with a rotating direction of the permanent magnet;

a stator yoke integrally comprising a first portion facing the permanent magnet when the holder is located at the first position, a second portion facing the permanent magnet when the holder is located at the second position, and a third portion facing the permanent magnet when the holder is located at a midst of the first and second positions; and a coil formed around the third portion of the stator yoke.

6. An optical characteristics switching mechanism according to claim 1, wherein the optical characteristics switching member includes a permanent magnet rotated integrally with the holder;

a first coil facing the permanent magnet when the holder is located at the first position, the first coil having a core formed from magnetic substance; and a second coil facing the permanent magnet when the holder is located at the second position, the second coil having a core formed from magnetic substance.

7. An optical head according to claim 1, wherein the optical characteristics switching means includes a coil rotated integrally with the holder, the coil having a core formed from magnetic substance;

a first permanent magnet facing the coil on a face crossing with a central axis of winding of the coil and serving as one of poles when the holder is located at the first position; and a second permanent magnet facing the coil on a face crossing with a central axis of winding of the coil and serving as another one of poles when the holder is located at the second position.

8. An optical head according to claim 7, the optical characteristics switching member including a first stopper which contacts the holder to stop rotation of the holder when the holder is rotated from the first position to the second position; and a second stopper which contacts the holder to stop rotation of the holder when the holder is rotated from the second position to the first position, wherein the first and second permanent magnets, the core of the coil, and the first and the second stoppers are positioned so that a force of the second permanent magnet, which attracts the core of the coil, exerts pressure on the holder to the first stopper when the holder contacts with the first stopper, and the force of the first permanent magnet, which attracts the core of the coil, exerts pressure on the holder to the second stopper when the holder contacts with the second stopper.

9. An optical head according to claim 1, wherein said optical characteristics switching mechanism causes the holder to move between the first and second positions mainly by use of a magnetic force of repulsion, and causes the holder to be held at one of the first and second positions mainly by use of a magnetic force of attraction.

10. An optical head according to claim 1, wherein the axis is substantially parallel to a direction in which the laser beam is output from the objective lens.

11. An optical disk apparatus comprising:

a driver for rotating an optical disk;

a laser beam emitting section;

an objective lens for converting the laser beam emitted by the laser beam emitting section to converted laser beam incident on an optical disk;

a photodetecting section for receiving a laser beam reflected by the optical disk; and an optical characteristics mechanism for switching optical characteristics of an optical system, between the laser beam emitting section and the objective lens, wherein the optical characteristics mechanism includes:

an objective lens supporting mechanism having the objective lens such that at least focusing of the objective lens is allowed to be controlled;

an optical element different from the objective lens;

a holder for the optical element;

a switching mechanism for rotating the holder about an axis extending in a direction substantially perpendicular to a direction in which the laser beam passes through the optical element, whereby the optical element is movable between a first position where the optical element is moveable between a first position where the optical is located in an optical path of the laser beam and a second position where the optical element is out of the optical path of the laser beam.

* * * * *